United States Patent [19]

Eckstein et al.

[11] Patent Number: 5,703,706
[45] Date of Patent: Dec. 30, 1997

[54] SPECTRAL MODIFICATION THROUGH PHASE MODULATION WITH SPATIAL EXTENT

[75] Inventors: James N. Eckstein, Cupertino; Majid L. Riaziat, San Jose; Gary F. Virshup, Cupertino, all of Calif.

[73] Assignee: Varian Associates, Inc., Palo Alto, Calif.

[21] Appl. No.: 585,128

[22] Filed: Jan. 11, 1996

Related U.S. Application Data

[62] Division of Ser. No. 307,222, Sep. 16, 1994, Pat. No. 5,517,346.
[51] Int. Cl.⁶ ............................................. H04J 14/02
[52] U.S. Cl. ................... 359/125; 359/130; 359/179; 359/341
[58] Field of Search ................................ 359/115, 125, 359/130, 157, 173, 126, 341, 343, 344, 349, 179; 385/3, 7, 8

[56] References Cited

U.S. PATENT DOCUMENTS 4,700,339 10/1987 Gordon et al. ................ 359/125
5,452,124 9/1995 Baker ............................. 359/341

OTHER PUBLICATIONS

Wiesenfeld, et al Cascadability and Fanout of Semiconductor Optical Amplifier Wavelength Shifter, Oct. 1992 IEEE Photonics Letters vol. 4 No. 10 pp. 1168–1171.

Romagnoli et al, Acousto–optic filter soliton control, Pure Appl. Opt Apr. (1995) pp. 441–449 195.

*Primary Examiner*—Wellington Chin
*Assistant Examiner*—Rafael Bacares
*Attorney, Agent, or Firm*—Edward Berkowitz

[57] ABSTRACT

An optical pulse propogating in an optical guide of an electro-optic medium interacts with a coplanar RF traveling wave to shift the optical wavelength. The RF phase is resynchronized to the optical pulse phase with spatial periodicity to provide a desired phase relationship between RF and optical radiation. A unidirectional incremental wavelength shifter comprises a frequency multiplexer for soliton communication and a symmetrical sideband modulator of this type varies the spectral width of probe illumination in an atomic absorption spectrometer probe beam.

1 Claim, 7 Drawing Sheets

SPECTRAL MODIFICATION THROUGH PHASE MODULATION WITH SPATIAL EXTENT

This application is a division of application Ser. No. 08/307,222, filed Sep. 16, 1994, now U.S. Pat. No. 5,517,346.

FIELD OF THE INVENTION

The invention relates to the field of optical spectrum altering devices with special applications to atomic absorption spectroscopy and to soliton based communication.

BACKGROUND OF THE INVENTION

It is known in the prior art to propagate an optical signal through an electro-optic crystal where a radio frequency, RF field is imposed on the crystal. The RF phase is adjusted to modulate the refractive index of the electrooptic medium to adjust the phase approximately linearly with time for the propagating optical pulse. The decreasing optical path produces an effect similar to that of uniform motion of the optical source toward the observer, e.g., a doppler upshift. A 180° shift in the RF phase creates the effect of uniform motion away from the observer (doppler downshift). See Duguay and Hansen, IEEE Journal of Quantum Electronics, QE-4, p.477, (1968). The effect is reviewed by Kaminow and Turner, Proc. IEEE, vol. 54, pp. 1122–1124 (1966).

In the present work, we describe a different structure wherein an RF traveling wave in an RF guide structure co-propagates with an optical pulse in an optical guide incorporating an electro-optic medium. The RF phase is adjusted in relation to the co-propagating pulse to produce a desired refractive gradient in the electro-optic medium whereby the optical pulse experiences a uni-directional wavelength shift of desired magnitude. In contrast to the lumped element arrangement of prior art (for which the refractive index is constant in space) the present invention yields a refractive index which is a function of space and time.

A very useful arrangement integrates, on a single substrate, the electro-optical modulator with the RF transmission line for use as a component in particular applications.

Consider a light pulse propagating through a nonlinear medium which exhibits a linear electro-optic coupling. A microwave signal $E_m$ propagates coincidentally with the optical pulse. The microwave field $$E_m = E_0 \sin(kz - \omega t) \qquad \text{Equ. 1}$$

produces a dynamic effect upon the refractive index of the nonlinear medium given by $$n = n_0 + \delta n \delta n = -(n_0^3 r_e E_m)/2 \qquad \text{Equ. 2}$$

where $n_0$ is the unshifted refractive index of the medium and $r_e$ is the effective first order electro-optic coefficient. Assume that the light pulse is spatially coincident with the microwave phase as illustrated in FIG. 1. As shown, the pulse is so located in time and space that it coincides with an increasing slope of the field $E_m$ and thus a reduced index of refraction at its trailing edge and an increased index of refraction at its leading edge, both instantaneously and locally. This results in the leading edge of the pulse traveling at a reduced velocity with respect to the trailing edge. As a result, the pulse is spatially squeezed. Although the pulse is spatially squeezed, the total number of wave periods or cycles remains the same, yielding a frequency upshift. A frequency downshift may be obtained by synchronizing the optical pulse with the opposite RF phase, e.g., by locating the optical pulse in a region of decreasing electric field $E_m$. The leading edge of the pulse then propagates at a relatively greater velocity than the trailing edge because the leading edge experiences a lesser index of refraction. Thus the pulse is spatially stretched, the same number of optical cycles occupying a greater spatial length.

In this discussion, it is sufficient to assume a positive electro-optical coefficient although that nothing herein is intended to limit the nature of the medium or the operating range wherein the coefficient has a specific sense.

In general, the refractive index is a function of the wavelength, especially when comparing optical and microwave radiation. As a consequence the optical propagation velocity (more specifically, the group velocity) is usually different from the phase velocity of the RF wavefront. In one embodiment of the present invention, this difference may be ameliorated by introducing period polarity reversals in the transmission line.

The present work embraces both a uni-directional incremental wavelength shift and bidirectional shifting similar to symmetrical sideband modulation. The uni-directional embodiment of the wavelength shifter of the present invention is useful in a wide range of measurement applications. The symmetrical bidirectional embodiment is also well suited for instrumentation as described herein.

In the prior art there has been an application for controlled wavelength shifting in the optical region in the area of atomic absorption spectrometry. It is known in that work to employ the Zeeman (or Stark)effect to shift the emission wavelength of a probe beam obtained from a hollow cathode lamp or the absorption wavelength of a test sample under the influence of an external field as described by U.S. Pat. No. 4,341,470. An electro-optic wavelength shifter has been described for a similar application by Cammann (U.S. Pat. No. 4,834,535). In the latter work an optical modulator is subject to an applied RF field and the optical beam is caused to repeatedly traverse the modulator. The RF field of the reference necessarily has a wavelength which is large compared to the dimensions of the modulator in contrast to the requirements of the present invention wherein an RF traveling wave locally modifies the optical properties of the modulator to provide a spatial and temporal modulation of the optical properties of the electro-optical medium.

It is known to employ the propogation of optical solitons on an optic fiber to support a communication system exhibiting unusually high bit rates. Such a system was studied and described by Mollenauer, Gordan and Islam, IEEE J. of Quant. Elect., vol. QE-22, pp. 157–173 (1986). A practical system of this type requires multiplexing of different channels on the same physical fiber. A frequency multiplexing and demultiplexing apparatus utilizing the present invention is described below.

DETAILED DESCRIPTION OF THE DRAWINGS

FIG. 3b is a double exposed photograph demonstrating a frequency upshift with the apparatus of FIG. 3a.

FIG. 3c is a double exposed photograph demonstrating a frequency downshift with the apparatus of FIG. 3a.

FIG. 4 shows measured dependance of the frequency shift on microwave power for the apparatus of FIG. 3a.

DETAILED DESCRIPTION OF THE INVENTION

Figure 1:
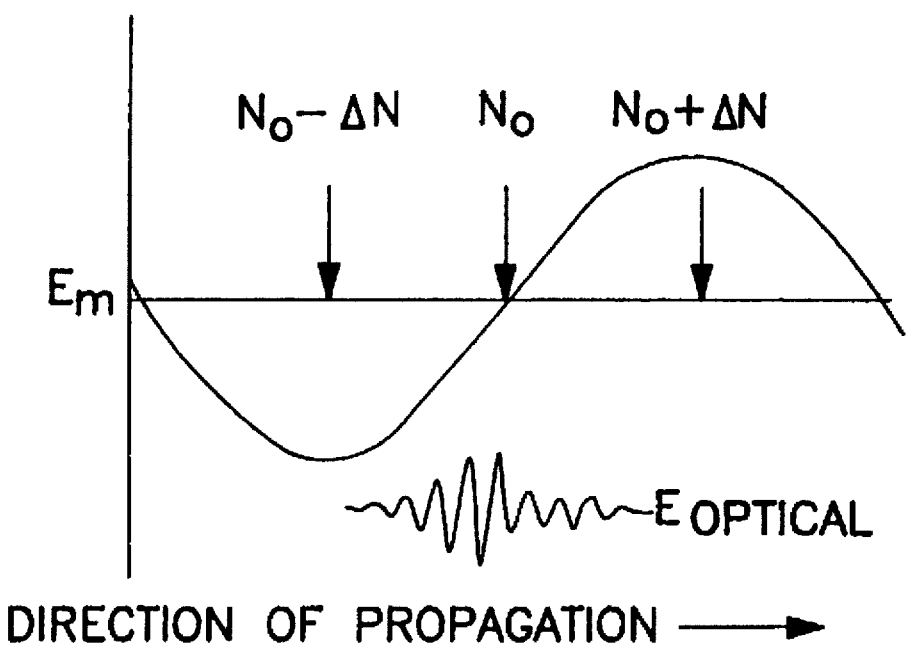
FIG. 1 shows the relative alignment of optical pulse and RF wavefront for an upshift of optical frequency.

Turning now to FIG. 1 there is shown a representation of the desired phase relationship to be maintained between an optical pulse (or wavefront) 12 and traveling microwave wavefront 14. As shown, the leading edge and trailing edge of the optical pulse concurrently experience a differential optical density which slows the leading edge relative to the trailing edge because the relative magnitude of the respective local electric fields so effects the electro-optic medium to reduce the refractive index locally in proportion to the local electric field. In the relationship shown the result is to compress the pulse producing an upshift in the optical frequency. If the relative phase were to be maintained with the optical pulse relatively phased as shown by pulse 16, the result would be to produce a frequency downshift.

The difference in phase velocity between the propagating RF wavefront and the group velocity of the optical pulse propagating in the optical guide may be treated, especially in the case of a non-TEM RF waveguide, by selection of operating point in the neighborhood of the cutoff point wherein the phase velocity varies over a range including the desired RF phase velocity. With selected design conditions, an arrangement may be found wherein the drift in phase difference between the RF wave and optical pulse amplitude envelope propagation may be held to a desired minimum.

Because of the difference in phase velocity of the propagating RF wavefront and the group velocity of the optical pulse, the phase relation of FIG. 1 will be lost as a function of distance along the propagation axis. In a preferred embodiment of the invention the phase relationship is periodically restored by the expedient of reversing the sense of the RF electric field with appropriate spatial periodicity. The distance L forming a spatial period between polarity reversals of this type to obtain a 180° phase shift is given by $$L = \frac{c}{2f(\sqrt{\epsilon_{\text{eff}}} - n)}$$

where f is the microwave frequency and n is the optical refractive index, $\epsilon_{\text{eff}}$ is the effective dielectric constant describing the phase velocity of the RF wave. Here, the phase velocity of the RF wave is given by $c/\sqrt{\epsilon_{\text{eff}}}$.

Figure 2A:
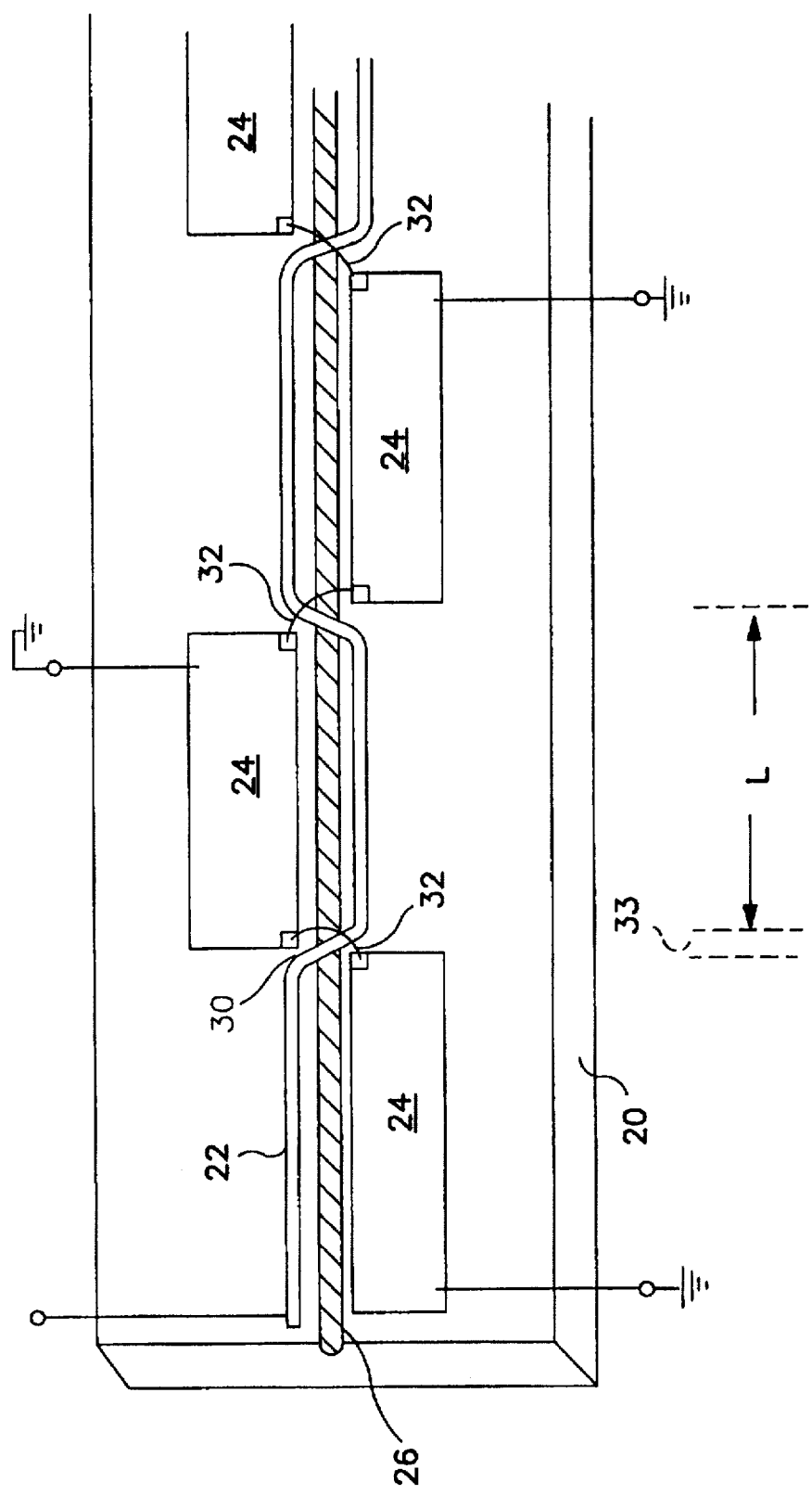
FIG. 2a shows a preferred ½ CPW integrated RF-optical guide of the present invention.

FIG. 2a shows the arrangement by which a preferred embodiment of the RF optical guide has been achieved with integration on a lithium niobate substrate 20. A half CPW geometry comprises RF propagation path 22 displaced from ground plane 24. Optical path 26 is defined in the substrate 20 with a titanium diffusion of 6μ width. The RF path 22 and ground plane 24 are segmented and geometrically alternate in symmetry about optical guide 26. Lithium niobate exhibits a refractive index of 2.25 for 1.06 micron wavelength z polarized radiation propagating along the y axis. For microwave radiation, the dielectric constant is about 35. Thus the phase velocity of the microwave signal is slower than both the phase and group velocity of the optical signal by about a factor of 2. The disparity in velocity of the optical and microwave signals is remedied by implementing periodic polarity reversals as shown in FIG. 2a. An oxide insulating layer 28 is disposed over the optical guide 26 and substrate 20 and the RF conductor 22 is thereby isolated from the optical guide 26 allowing the crossover portion 30 invert the conductor 22 about the propagation axis. An airbridge 32 serves the concomitant purpose for the ground plane 24. For one experimental device the spatial period L was chosen to be 4.34 mm. A reversal gap 33 between sections occupied 60 microns along the axis.

Alternate arrangements for re-synchronizing the RF and optical phases in the combined RF/optical transmission line are discussed below.

Figures 1, 2B:
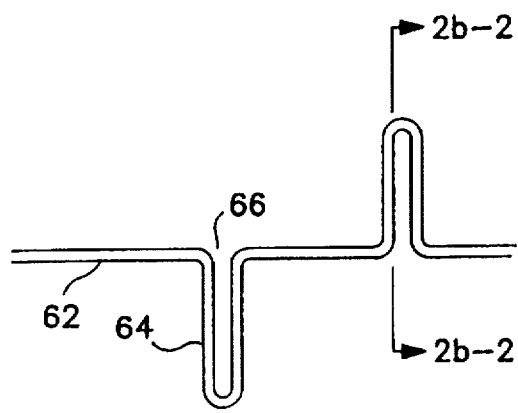
FIG. 2b shows another arrangement for introducing the optical phase shift in the present invention.
Figures 2, 2B:
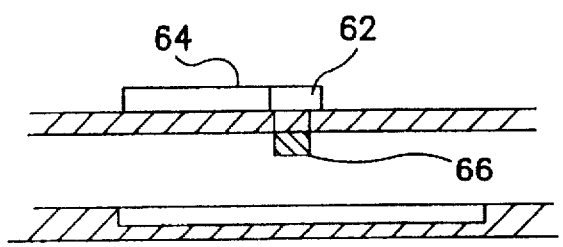

At FIG. 2b band section AA thereof there is shown an RF conduction path 62 which exhibits delay segments 64 designed to introduce a sufficient delay to realize a phase shift of substantially 180° in respect of the optical pulse propagating on optical guide 66. Optical guide 66 is disposed between RF path 62 and ground plane 68.

Figure 2C:
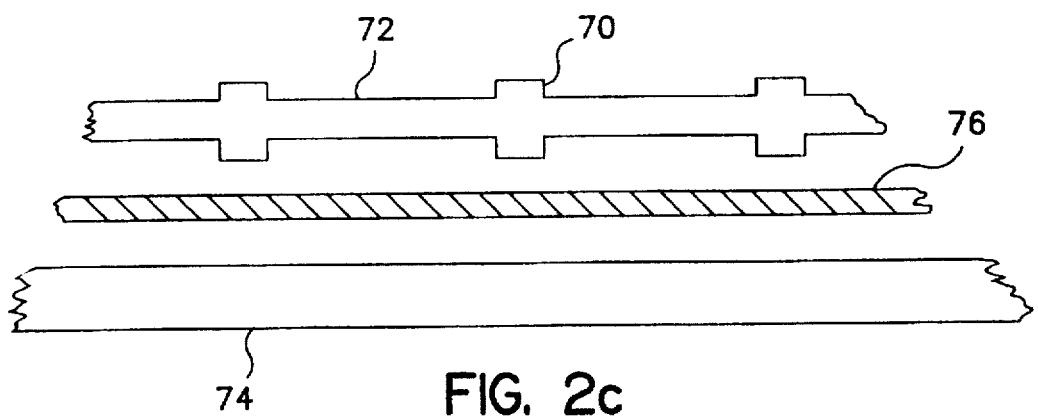
FIG. 2c shows an alternative for introducing phase shifts in the traveling RF wavefront.

Yet another alternate arrangement is illustrated in FIG. 2c where a half CPW transmission line includes lumped capacitances 70 implemented in known manner to achieve a phase shift of 180° for the propagating RF wavefront. One skilled in the art will recognize that a number of approaches may be taken to realize the desired phase shift for re-synchronizing the RF energy and optical pulses. Both of these alternate arrangements require significant additional processing to construct the integrated device.

Figure 2D:
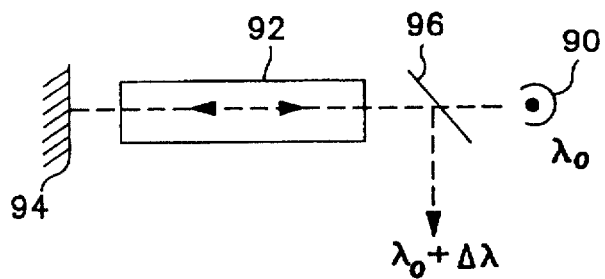
FIG. 2d shows a single ended geometry for a wavelength shifter of the present invention.

The geometry of the wavelength shifter of the present invention may take the form of the single ended embodiment shown in FIG. 2d. The wavelength shifter 92 as previously described, receives incident light from source 90 and both optical and RF radiation are reflected by symbolic reflecting means 94 back through the shifter 92. A frequency selective element 96 selectively reflects (as in the example FIG. 2d) optical output of frequency greater than a selected value. If the selected critical frequency for element 96 corresponds to a value slightly greater than $c/\tau_c$, where c is the coherence length and $\tau_c$ is the line width of the optical transition, then the shifted wavelength will be available over a substantial range. Notice that passage through a doubled path length will produce twice the frequency shift as experienced over the single transit geometry.

Figure 3A:
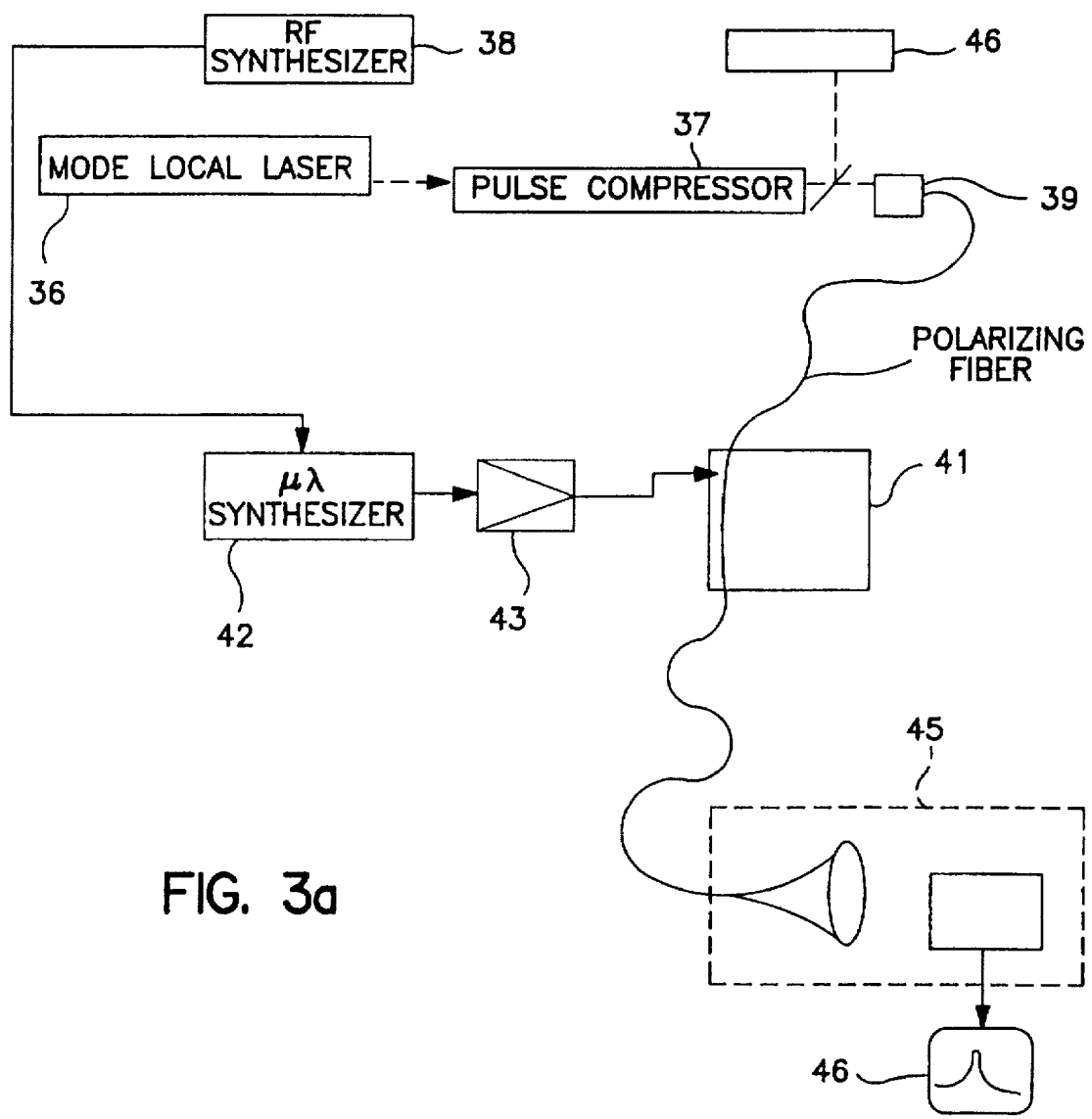
FIG. 3a illustrates apparatus employed to demonstrate the invention.
Figure 3B:
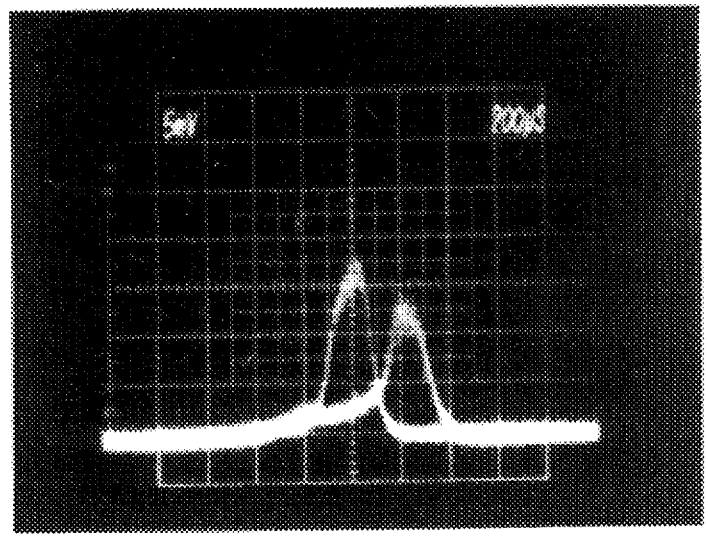
Figure 3C:
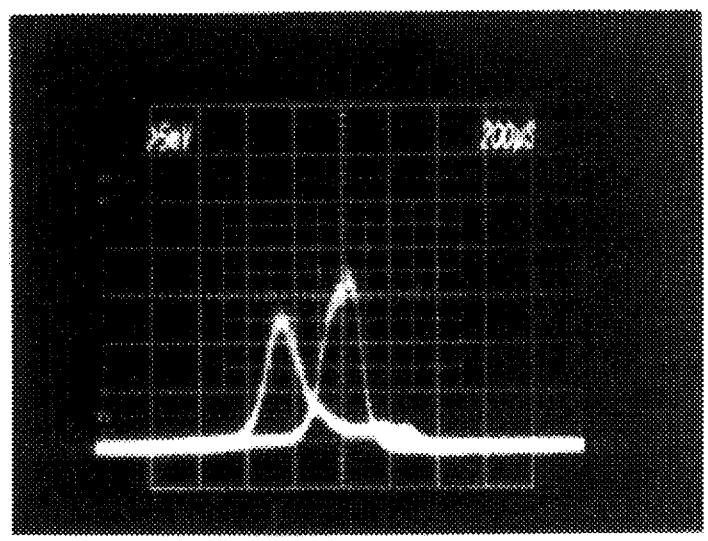

The preferred embodiment of FIG. 2a has been tested to demonstrate wavelength shifting capabilities. The test apparatus is shown in FIG. 3a where a Nd:YLF laser 36 generates 60-ps optical pulses of 1.054 nm wavelength at 75.7 MHz repetition rate which are compressed to 10 ps pulse width by pulse compressor 37. RF synthesizer 38 establishes the laser pulse repetition rate and correlates the phase of the microwave synthesizer 42. The microwave output of synthesizer 42 is amplified in TWT amplifier 43 and then applied to the microwave transmission line of the waveshifter 41. The compressed optical pulses are directed through optical polarizing fiber 39 to the wavelength shifter 41 and thence to optical spectrum analyzer 45, the output of which is displayed on oscilloscope 46. The wavelength shifting thus achieved is reproduced at FIGS. 3b and 3c. These figures are double exposed photographic records of the optical spectrum acquired from an optical spectrum analyzer. The double exposure superimposes the the unshifted optical spectrum centered in the image and the shifted optical spectrum obtained by applying RF power to the device. The only variable adjusted between the tests of FIGS. 3b and 3c is the phase of the signal derived from microwave synthesizer 42. The microwave power was approximately 16 W at 17.2596 GHz, which corresponds to the 228$^{th}$ harmonic of the laser repetition rate. Each horizontal division of the oscilloscope display of FIGS. 3b and 3c represents 265 GHz.

Figure 4:
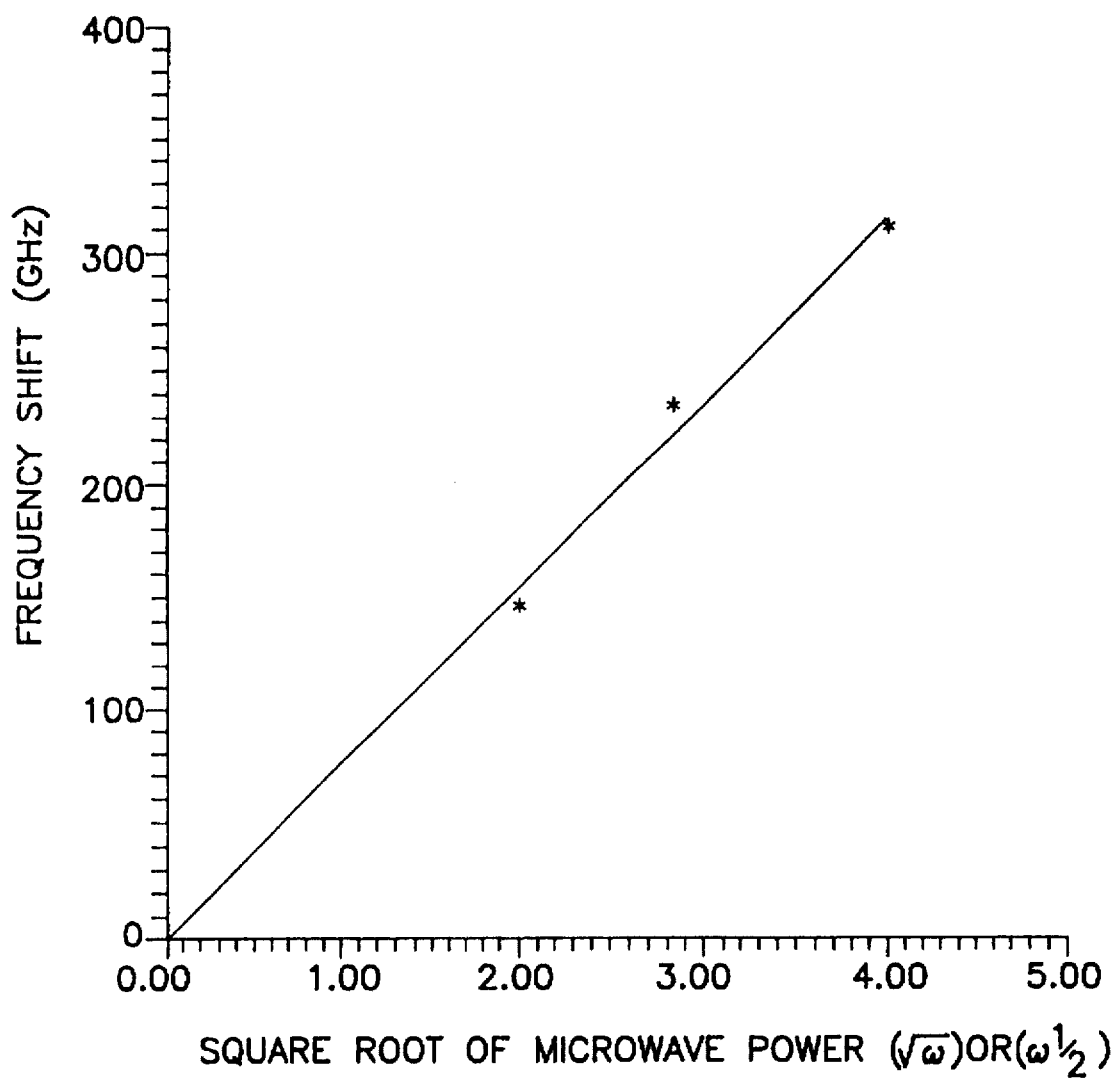

For small wavelength shifts the change in frequency should be linear in the microwave electric field or should scale with the square root of the microwave power as shown by equation 1 and 2. FIG. 4 demonstrates the scaling of the frequency shift with microwave power in agreement with theoretical predictions.

Figure 5:
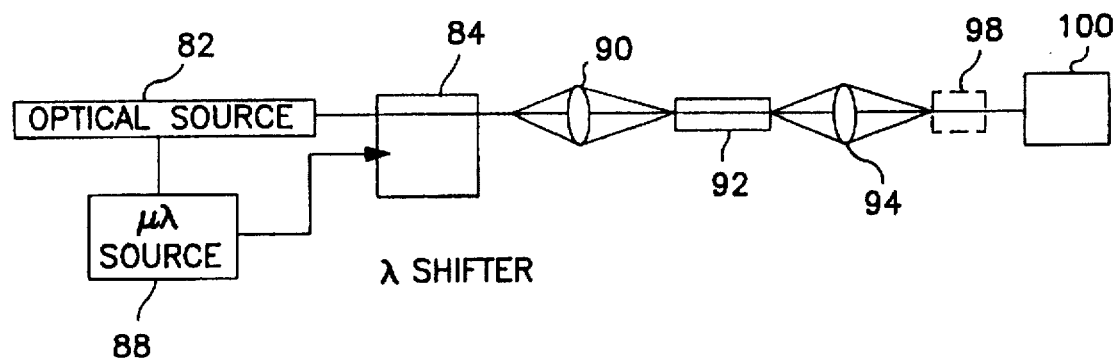
FIG. 5 is a block diagram of an atomic absorption spectrometer incorporating the present invention.

FIG. 5 shows a schematic arrangement for an atomic absorption spectrometer incorporating a wavelength shifter as herein described. An incoherent light source 82 is directed to propagate through polarizer 96 and then into an optical guide 84 comprising an electro-optic medium, such as by way of example, lithium niobate. The optical guide is disposed together with an RF transmission line or guide 86 such that an RF traveling wave propagating on transmission line 86 influences the electro-optic medium to locally modify the optical properties thereof. The RF source 88 includes means to tune the RF energy in frequency and phase to obtain desired values. The optical output of the modulator is then directed through collimator lens 90 to transit an atomized sample in atomizing apparatus 92. In one arrangement this atomizing apparatus includes a carbon rod furnace and associated equipment for treating a sample to produce an atomic vapor. A focusing lens 94 images the light source on monochromator. The analyzed optical signal is then converted to an electrical signal by detector 100.

In the context of this AA application either a cw mode of operation or a pulsed mode may be used, but a cw embodiment is usually preferred. The cw optical energy intensity is phase modulated with the RF traveling wave in the wavelength shifter of the invention to produce a temporally varying optical wavelength. The spectral content of the optical beam derived from the wavelength shifter will consist of a pair of sidebands $\lambda_0 \pm \lambda$. By modulating the phase shift it is possible to concentrate the optical power into sidebands of the optical carrier under the condition that the Bessel function representing the modulation of the carrier at modulation index m, i.e., $J_0(m)$ vanishes. The unshifted wavelength will be effectively suppressed if the microwave frequency f>>1/τ where τ is the homogeneous linewidth for the transition. The microwave period is thus short in comparison with the optical transition lifetime. The optical spectrum is distorted to localize the spectral density into two lobes symmetrically displaced with respect to the center frequency. The position of these lobes is thus variably displaceable as the wavelength is (symmetrically) shifted to sweep over the spectral region of interest in the AA measurement. This mode of operation is analogous to the effect achieved in the prior art U.S. Pat. No. 4,341,470 utilizing the longitudinal normal Zeeman effect of the light source although the physical phenomenum is quite distinct. In the present embodiment the modulation of phase in the phase shifter of the present invention is several orders of magnitude greater than could be achieved using the magnetic field switching to carry out the analogous Zeeman effect type-measurement.

Figure 6:
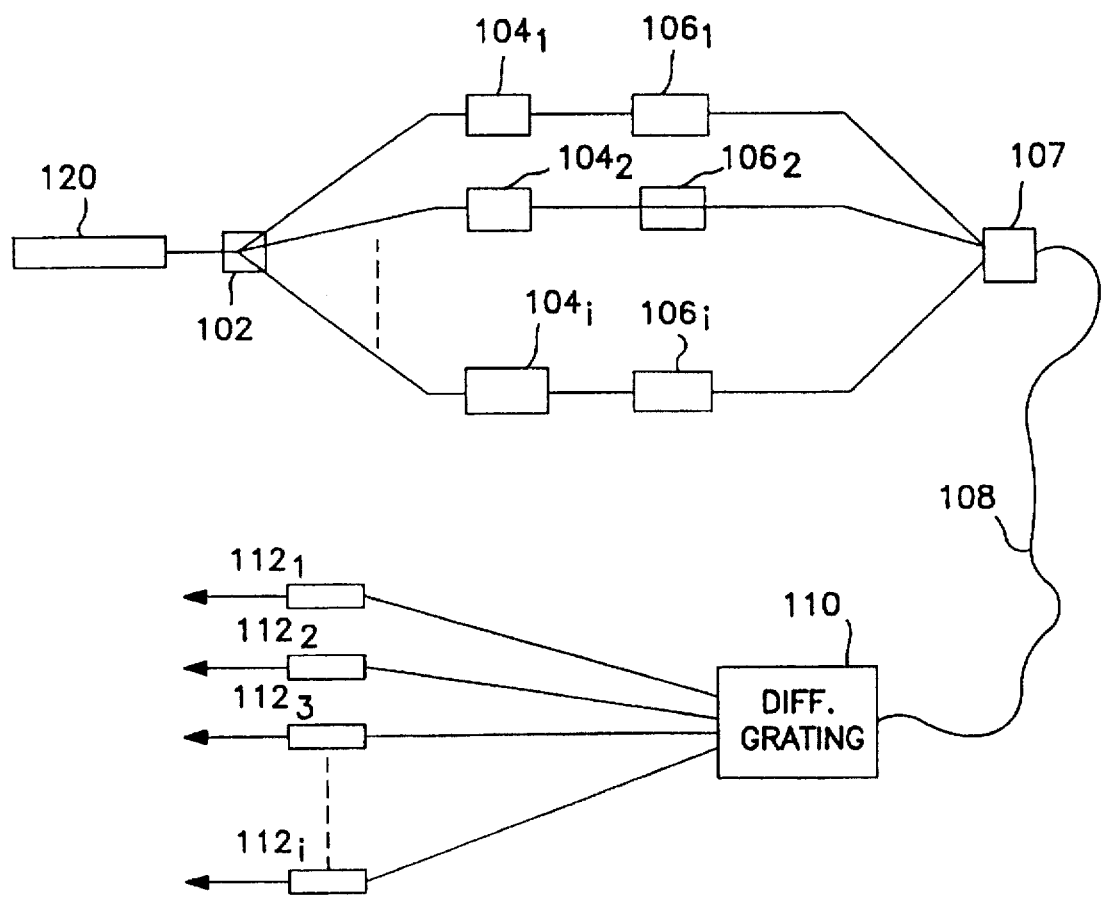
FIG. 6 is a block diagram of a soliton based communication system incorporating the present invention.

Another particularly useful application for the wavelength shifter here described occurs in the context of a multichannel optical communication system utilizing a soliton optical source. Such systems are capable of repeaterless operation over thousands of miles and thus represent a considerable economy for terrestrial communication systems. FIG. 6 describes this context schematically for a frequency division multiplex arrangement. Soliton source 120 provides pulsed energy which is divided into a number of subchannels by known fanout means 102, in each of which channels the respective soliton pulse traverses the corresponding wavelength shifter $104_i$ herein described. The wave shifted soliton is then directed to the channel information modulator $106_i$. The respective subchannels are then recombined in known manner at combiner 107 for transmission over optical fiber 108. Demultiplexing is accomplished by analyzing the combined optical signal derived from the optical fiber 108 as for example by means of diffraction grating 110. The wavelength resolved optical energy is collected by a corresponding detector $112i$ for further processing within that subchannel communication destination. In each subchannel the presence or absence of a soliton pulse at the respective clocked period for the corresponding subchannel encodes binary information for that subchannel as presently practiced in analogous communication systems.

Other soliton communication arrangements based upon the wavelength shifter of the present invention include modulation of the individual soliton to impress a proportional digital signal thereon. For example in a simple arrangement, a ternary code is supported by the three possible states of upshift, downshift or unshifted frequency of the soliton. Other schemes of encoding information will readily occur to the worker skilled in the art.

In a soliton communication system, the optical medium will support a number of channels for which there may occur superpositions of solitons. Bidirectional communication traffic assures that such superpositions may occur at high rates. The frequency displacement obtained with the present invention for colliding pulses minimizes any substantial interaction therebetween with a minimal incidence of crosstalk.

While there have been described and illustrated several specific embodiments of the invention, it will be clear that variations in the details of the embodiments specifically illustrated and and described may be made without departing from the true spirit and scope of the invention as defined in the appended claims.

What is claimed is:

1. A multichannel optical communication system comprising
   (a) a source of optical solitons of selected wavelength,
   (b) a multiplexer for separating a plurality of trains of solitons from said source,
   (c) a plurality of wavelength shifters, each said wavelength shifter operative upon a corresponding train of solitons to shift the wavelength of said train of solitons to a desired value,
   (d) a plurality of modulation means, each said modulation means operative upon a corresponding train of solitons to vary the amplitude of the solitons thereof whereby information is impressed upon said train of solitons,
   (e) demultiplexer means for recombining said plurality of trains of solitons to propogate over an optical fiber,
   (f) wavelength dispersive means for receiving said plurality of trains of solitons and directing solitons of like wavelength to propagate over one of a corresponding plurality of optical paths.

* * * * *